United States Patent

Scruby et al.

Patent Number: 5,828,211
Date of Patent: Oct. 27, 1998

[54] DETERMINING STRESS IN FERROMAGNETIC MATERIALS FROM MEASUREMENTS OF MAGNETIC ANISOTROPY AND MAGNETIC PERMEABILITY

[75] Inventors: Christopher Brian Scruby, Botley; David John Buttle, Wantage; Fiona Anne Ravenscroft, Sutton Courtenay, all of United Kingdom; Carlo Guido de Michelis, Milan, Italy; Massimo Gori, Milan, Italy; Giampiero Antonelli, Milan, Italy

[73] Assignees: AEA Technology PLC, Didcot, United Kingdom; Centro Informazioni Studi Esperienze SPA, Milan, Italy

[21] Appl. No.: 553,272
[22] PCT Filed: May 12, 1994
[86] PCT No.: PCT/GB94/01022
§ 371 Date: Nov. 16, 1995
§ 102(e) Date: Nov. 16, 1995
[87] PCT Pub. No.: WO94/28407
PCT Pub. Date: Dec. 8, 1994

[30] Foreign Application Priority Data

May 21, 1993 [GB] United Kingdom ............... 9310803

[51] Int. Cl.$^6$ ............... G01B 7/24; G01R 33/18
[52] U.S. Cl. ............................................. 324/209
[58] Field of Search ................... 324/202, 209; 73/779

[56] References Cited

U.S. PATENT DOCUMENTS 5,010,299 4/1991 Nishizawa et al. .............. 324/209

FOREIGN PATENT DOCUMENTS

| 0027368 | 4/1981 | European Pat. Off. . | |
|---|---|---|---|
| 0389877 | 10/1990 | European Pat. Off. . | |
| 0253685 | 1/1988 | German Dem. Rep. | 324/209 |
| 402262026 | 10/1990 | Japan | 324/209 |
| 0186725 | 8/1991 | Japan | 324/209 |
| 1185126 | 10/1985 | U.S.S.R. | 324/209 |
| 8901613 | 2/1989 | WIPO . | |

OTHER PUBLICATIONS

Dr. Kajalainen et al., Detection of Fabrication Stresses by the Barkhausen Noise Method, University of Oulu, Finland, pp. 1–18, 1985.

Primary Examiner—Sandra L. O'Shea
Assistant Examiner—Jay M. Patidar
Attorney, Agent, or Firm—William H. Holt; William R. Hinds

[57] ABSTRACT

The absolute values of biaxial stresses in a ferromagnetic material (16) are measured using a probe (12) which comprises an electromagnet (26), a sensor (32) for stress-induced magnetic anisotropy (SMA) and a sensor (30) for directional effective permeability (DEP). The DEP sensor (30) enables absolute values of stress to be determined; the SMA sensor (32) enables the directions of the principal stress axes to be accurately determined, and improves the accuracy of the stress measurements.

10 Claims, 4 Drawing Sheets

DETERMINING STRESS IN FERROMAGNETIC MATERIALS FROM MEASUREMENTS OF MAGNETIC ANISOTROPY AND MAGNETIC PERMEABILITY

This invention relates to a method and to an apparatus for measuring stress in a ferromagnetic material.

BACKGROUND OF THE INVENTION

Steel, which is a ferromagnetic material, is a widely used construction material. To evaluate the safety of a structure it would be desirable not only to be able to detect defects (for example using ultrasonics), but also to measure the stress in the material, for example the stress around a defect which affects the likely behaviour of the defect. Hence a reliable non-destructive way of measuring the total stress (including residual, applied, static and dynamic components) would be desirable. A variety of magnetic techniques are known to have some sensitivity to stress, for example magnetoacoustic emission, Barkhausen emission, coercivity, stress-induced magnetic anisotropy, directional effective permeability, or incremental permeability over a whole magnetic cycle, although magnetic measurements are usually also affected by other material properties such as microstructure. For example EP-A-0 389 877 (Nikkoshi) teaches that stress in steel may be determined from the reversible magnetic permeability in the approach to saturation; it also states that using the variations in magnetic permeability to determine principal stresses does not enable reproducible results to be obtained. Ultrasonic measurements, X-ray diffraction and neutron diffraction can also provide information about microstructure and/or stress. It has also been suggested, for example in QT News, November 1992, that a combination of magnetic techniques may enable the effects of residual stress to be isolated.

According to the present invention there is provided a method for measuring stress in a ferromagnetic material, the method using a probe comprising an electromagnet means defining an electromagnet core and two spaced apart electromagnet poles, a first magnetic sensor between the two poles and arranged to sense magnetic flux density perpendicular to the direction of the free space magnetic field between the poles, a second magnetic sensor arranged to sense the reluctance of that part of the magnetic circuit between the poles of the electromagnet means, and means to generate an alternating magnetic field in the electromagnet means, the method comprising arranging the probe with the poles adjacent to a location on a surface of the ferromagnetic material, generating an alternating magnetic field in the electromagnet means and so also in the ferromagnetic material with a maximum amplitude well below magnetic saturation, turning the probe so the alternating magnetic field in the ferromagnetic material has in succession a plurality of different orientations, detecting the signals from the first sensor with the magnetic field in the plurality of different orientations, determining from the orientations of the magnetic field at which the maxima and minima of the signals from the first sensor occur the directions of the principal stress axes, detecting the signals from the second sensor at least when the magnetic field is aligned with the directions of the principal stress axes, processing the signals from the second magnetic sensor by backing them off with a back-off signal preset such that when the probe is adjacent to a stress-free location the backed-off signal is zero, and then resolving that component of the backed-off signal which, in the impedance plane, is perpendicular to the effect of lift-off from the surface, and using the values of the resolved component with the magnetic field aligned with the directions of the principal stress axes to determine the values of the principal stresses at that location in the material.

The first sensor would detect no signal if the material were exactly isotropic; however stress induces anisotropy into the magnetic properties of the material, and so the signals received by the first sensor are a measure of this stress-induced magnetic anisotropy (SMA). The variations in the SMA signal as the probe is rotated enable the directions of the principal stress axes to be accurately determined. The first sensor is preferably a first sensing coil, and the measured signal may be the emf induced in the first sensing coil. The use of a magnetic measurement of this type is described in WO 89/01613 (Langman).

The second sensor senses the reluctance of that part of the magnetic circuit between the poles and so it provides a measure of the permeability of the material through which the flux passes. As the probe is turned this sensor hence provides a signal indicative of the effective permeability of the material in different directions: this is referred to as directional effective permeability (DEP). The second sensor is preferably a second sensing coil, and is preferably wound onto the electromagnet core. In this case the signals from the coil relate to the reluctance of the complete magnetic circuit. The measured parameter might be the impedance of the coil. The alternating magnetic field is preferably generated by a coil, which may be the second sensing coil, but is preferably a separate coil as this enables a better signal to noise ratio to be achieved, and in this case the measured parameter is preferably the induced emf. Alternatively the second sensor might be arranged between the poles, to detect the magnetic flux density parallel to the free space magnetic field; the flux density in this case decreases as the permeability increases. The DEP signals enable the values of the stress to be determined; this determination requires the SMA signals in order to specify the stress axes accurately, and may utilise the SMA signals too in determining the values of the principal stresses.

Thus, before DEP measurements are made, the probe is placed adjacent to a region of surface where the stress is negligible (or at any rate known) and the value of the signal is then backed off to give zero signal. The small changes in DEP due to stress are then easier to measure.

The DEP signals can be resolved as a component in-phase with the current creating the alternating field, and a component in quadrature to that; these components correspond to resistance and reactance in the impedance plane. If the gap between the surface and the probe (the lift-off) varies, this has an effect on the DEP signals. This change corresponds to a direction in the impedance plane oriented in a direction referred to as the lift-off angle. Hence to avoid spurious effects due to changes in lift-off, the output DEP signal is then resolved in a direction at right angles to the lift-off direction in the impedance plane. Both the back-off and the lift-off initialisation must be performed before measurements can be made.

The electromagnet means may comprise a C or U-shaped core of laminated transformer steel (e.g. grain oriented silicon steel). Other materials can be adopted as long as they have good magnetic permeability and sufficiently high magnetic saturation, such as mu-metal. A coil of wire is wound around the core and is connected to a suitable alternating current supply. As indicated earlier this coil may be used as the second sensor, as its impedance varies with the permeability of the material under test. Better sensitivity can be achieved however by winding two coils on the core, one of which is connected to the current supply and the other acts as the second sensor; this arrangement provides a better signal to noise ratio. In operation the magnetizing field due to the current alternates, driving the material under test through small hysteresis loops with a maximum amplitude (typically a few A/cm) well below magnetic saturation. The operating frequency is desirably between 50 Hz and 1000 Hz, most preferably between 100 Hz and 500 Hz. The lower the frequency the greater the effective depth of penetration of the magnetic changes below the surface.

The size of the probe is desirably small; for example it might fit within a cylindrical casing of external diameter less than 50 mm, preferably less than 20 mm. This makes possible good spatial resolution (as the magnetic properties are effectively averaged over the area of the end of the probe adjacent to the two poles). Furthermore the smaller the probe diameter the less is the effect of any curvature of the surface of the material.

The SMA and DEP measurements may be made simultaneously. Alternatively they may be made successively, and in this case they may be made with different frequencies of alternating current (and so of magnetic field), for example at 300 Hz for DEP and at 68 Hz for SMA. Preferably the amplitudes of the alternating currents are such that the magnetic field has the same value for both SMA and DEP measurements. Ideally the measurements would both be made at the same frequency, to achieve the same depth of penetration. However DEP is more sensitive to stress at higher frequencies, so in practice the frequency at which DEP is performed is a compromise between sensitivity and penetration. Indeed the frequency may be varied in order to vary the depth of penetration.

The probe may be turned through a complete revolution, and measurements of both SMA and DEP made continuously or at several angular orientations, for example every 10°. The rotation may be performed manually, or by a motor; and the probe preferably incorporates a sensor to provide signals representing its orientation. The SMA measurements vary approximately sinusoidally with angular orientation of the probe, with maxima and minima when the magnetic field direction in the material is aligned with the bisector of the angle between the principal stress axes in the plane tangential to the surface. Determination of the probe orientations for which the SMA measurements have their maxima and minima therefore enables the directions of the principal stress axes to be determined.

DEP measurements are also required with the magnetic field direction (i.e. the line joining the centre of the two poles) oriented with the principal stress axes, at which orientations the DEP measurements have their maxima and minima. Preferably DEP measurements are made at several different orientations, and on the basis of the known way in which DEP varies with orientation all the measurements can be used to obtain a more accurate estimate of the values at the principal stress axes.

The probe of the invention enables stresses, including residual stresses, in a steel structure to be measured non-destructively, at least in a region near the surface of the structure. The probe can be scanned over the surface to find how the stresses vary with position, for example in the vicinity of a weld. The probe can readily be adapted for underwater use, for example by a diver for inspecting under-sea parts of an oil rig.

BRIEF DESCRIPTION OF THE DRAWINGS

The invention will now be further described by way of example only, and with reference to the accompanying drawings in which.

DESCRIPTION OF THE PREFERRED EMBODIMENTS

Figure 1:
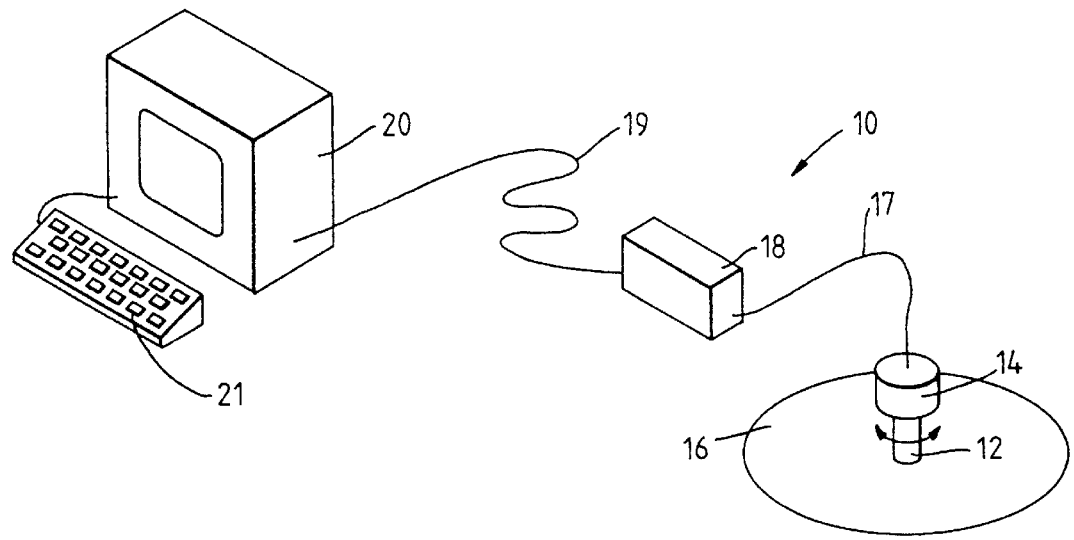
FIG. 1 shows a diagrammatic view of an apparatus for measuring stress.

Referring to FIG. 1, a stress measuring apparatus 10 includes a sensor probe 12 comprising SMA (stress-induced magnetic anisotropy) and DEP (directional effective permeability) sensors, the probe 12 being attached to an electric motor 14 which can be held by an operator, or which may be held by a support mechanism (not shown), so the motor 14 can turn the probe 12 with one end adjacent to a surface of a steel object 16 in which the stress is to be determined. The sensor probe 12 and motor 14 are connected by a 2 m long umbilical cable 17 to a signal conditioning/probe driver unit 18. The unit 18 is itself connected by a long umbilical cable 19 (which may be for example up to 300 m long) to an interface unit within a microcomputer 20, which has a keyboard 21. Operation of the apparatus 10 is controlled by software in the microcomputer 20.

The interface unit within the microcomputer 20 generates sine and cosine functions at an angular frequency selectable by software, and buffers the sine waveform for transmission to the unit 18 for driving the probe 12. The amplitude of the transmitted waveform is also selectable by software. It also provides control signals to control the angular position of the probe 12 by means of the motor 14. The interface unit also provides control signals to the unit 18 to select which of the signals available from the probe 12 is to be transmitted for analysis. It demodulates the selected input signal (SMA or DEP) to derive its in-phase and quadrature components, filters the demodulated signal to remove high frequency components and to reduce noise, and converts the analogue signals to digital form for input to the computer 20. It also detects the angular position of the probe 12 from signals from a position encoder (not shown) on the motor 14.

The long umbilical cable 19 incorporates a coaxial cable to transmit the selected signal (SMA or DEP), and wires to control which signal is selected, to control the motor 14, to transmit signals from the position encoder, to transmit the sinusoidal waveform, and to convey electrical power. The unit 18 converts the drive waveform from a voltage to a current drive for the probe 12; buffers and amplifies the SMA and DEP signals from the probe; and selects which signal is to be transmitted to the microcomputer 20. It also buffers the signals from the position encoder for transmission, and drives the motor 14 in response to control signals.

Figure 2:
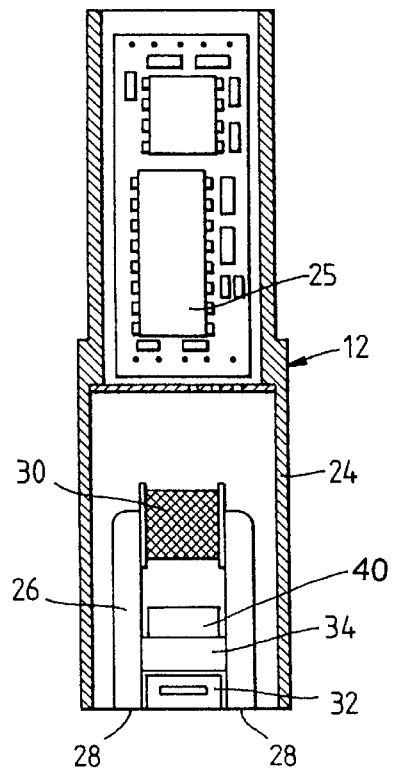
FIG. 2 shows a longitudinal sectional view of a probe for use in the apparatus of FIG. 1.

Referring now to FIG. 2 the probe 12 is shown detached from the motor 14, in longitudinal section though with the internal components shown in elevation. The probe 12 comprises a cylindrical brass casing 24 of external diameter 16.5 mm and of overall height 60 mm, the upper half being of reduced diameter whereby the probe 12 is attached to the motor 14. The upper half of the casing 24 encloses a head amplifier 25. The lower half encloses a U-core 26 of laminated mu-metal (a high permeability nickel/iron/copper alloy) whose poles 28 are separated by a gap 7.5 mm wide, and are each of width 2.3 mm, and of thickness 10 mm (out of the plane of the Figure). The poles 28 are in the plane of the lower end of the casing 24. Around the upper end of the U-core 26 is a former on which are wound two superimposed coils 30. One coil 30 (which has 200 turns) is supplied with the sinusoidal drive current from the unit 18; the other coil 30 (which has 70 turns) provides DEP signals. Between the two poles 28 is a rectangular resin-impregnated paper laminate former on which is wound a 1670-turn rectangular coil 32, about 4 mm high and 6 mm wide, and 6 mm-square as seen from below, the windings lying parallel to the plane of the Figure so the longitudinal axis of the coil 32 is perpendicular to the line between the centres of the poles 28. The coil 32 is supported by a support plate 34 fixed between the arms of the U-core 26 so the lower face of the coil 32 is in the plane of the poles 28. The coil 32 provides the SMA signals. Both the DEP and the SMA signals are amplified by the head amplifier 25 before transmission to the unit 18.

In operation of the system 10 the motor 14 is supported so the lower end of the probe 12 is adjacent to the surface of the object 16 and the longitudinal axis of the probe 12 is normal to the surface. The probe 12 is first placed adjacent to a region of the object 16 where the stresses are negligible. An alternating current of the desired frequency and amplitude is supplied to the drive coil 30. The in-phase and quadrature DEP signals received by the microcomputer 20 are firstly backed off to zero and the backing off value then fixed; then the probe 12 is lifted slightly, and from the changes in the DEP signals the lift-off angle in the impedance plane is determined.

The probe 12 is then placed adjacent to a region in which the stress is to be measured. The orientation of the line joining the centres of the poles 28 (referred to as the orientation of the probe 12) is noted relative to a fixed direction on the surface. The motor 14 is then energised to turn the probe 12, for example in a step-wise fashion 10° at a time through a total angle of 380°. At each orientation of the probe 12 the quadrature SMA signal is measured (at a drive current frequency of 68 Hz), and the DEP signal in a direction in the impedance plane perpendicular to the lift-off direction is determined (at a drive current such as to produce the same magnetic field but at a frequency of 300 Hz). The current is typically in the range 300 to 400 mA.

Figure 3:
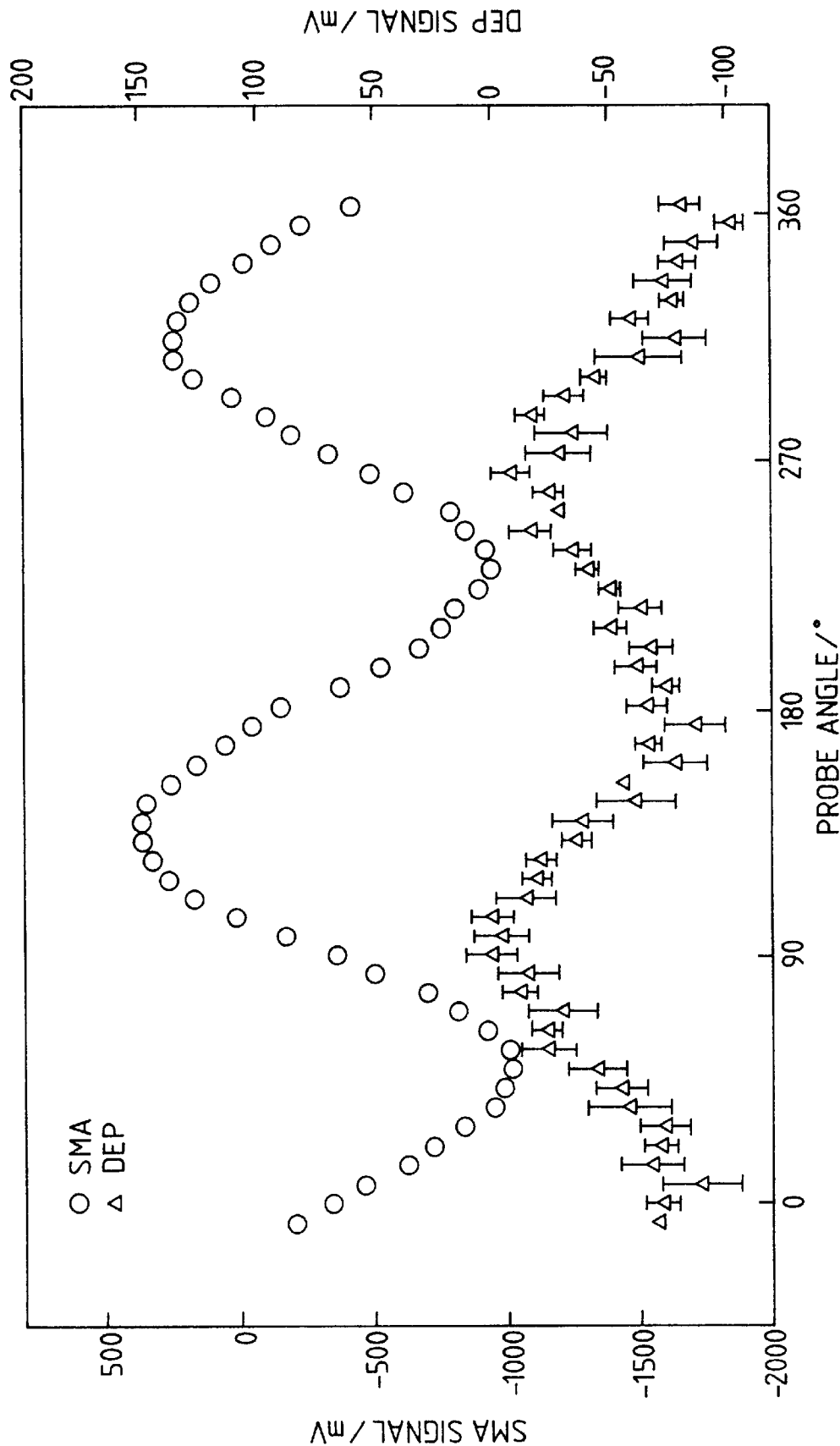
FIG. 3 shows graphically the variations in SMA and DEP signals measured during rotation of the probe of FIG. 2.

Referring to FIG. 3 there are shown graphically the values of the quadrature SMA signals, and of the DEP signals (backed-off and resolved at right angles to the lift-off angle) at different orientations of the probe 12, indicated as the angle from the initial orientation, as experimentally determined on a steel specimen. It will be observed that the SMA values vary sinusoidally with probe orientation and that the orientation for which the SMA values have their maxima and minima can readily be determined. The directions midway between these two orientations are the directions of the principal stress axes. The DEP values are less accurate (the vertical lines through the plotted points indicating the uncertainty in the measurements), but as they should vary sinusoidally with probe orientation the values of DEP in the principal stress directions can hence be determined.

The values of the stresses in the directions of the principal stress axes can then be determined from the experimental measurements of DEP in those directions, and from the magnitude of the fluctuations in the SMA signal during rotation of the probe 12. This requires calibration of the apparatus 10, taking measurements in the manner described above on a sample of material of the same type as that of the object 16, while subjecting it to a variety of different stresses. This may be done with a cross-shaped sample, whose arms are aligned with the axes of a test rig, SMA and DEP measurements being made at the centre of the sample where the principal stress directions are aligned with the axes of the test rig.

Figure 4:
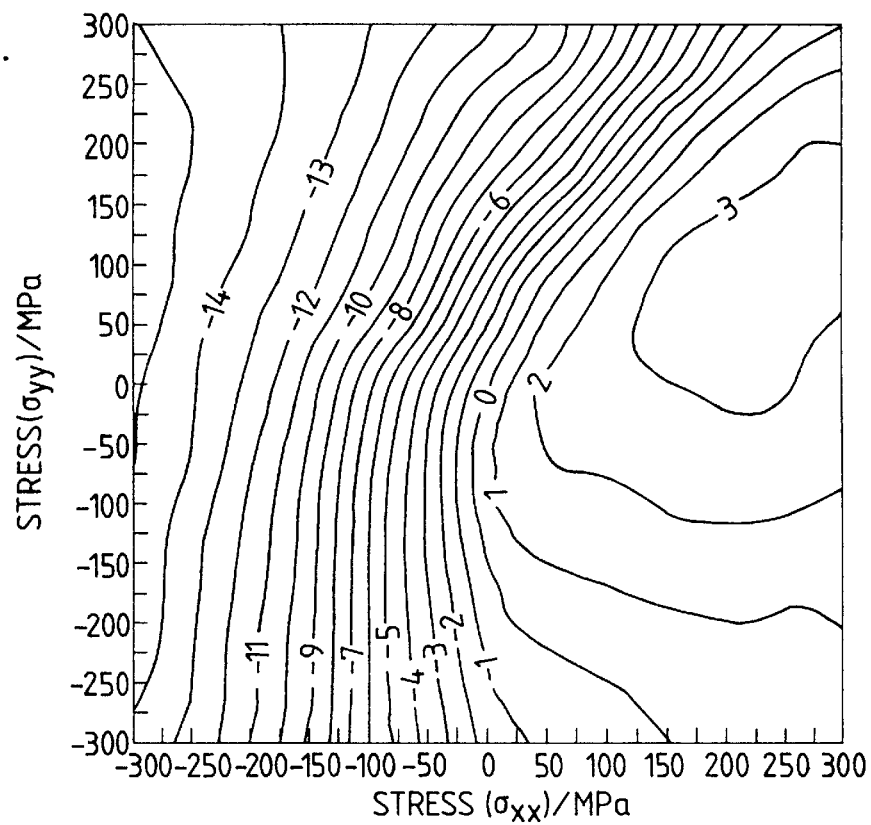
FIG. 4 shows graphically experimental measurements of the variation of the DEP signal with biaxial stresses, with the probe aligned parallel to a principal stress axis.
Figure 5:
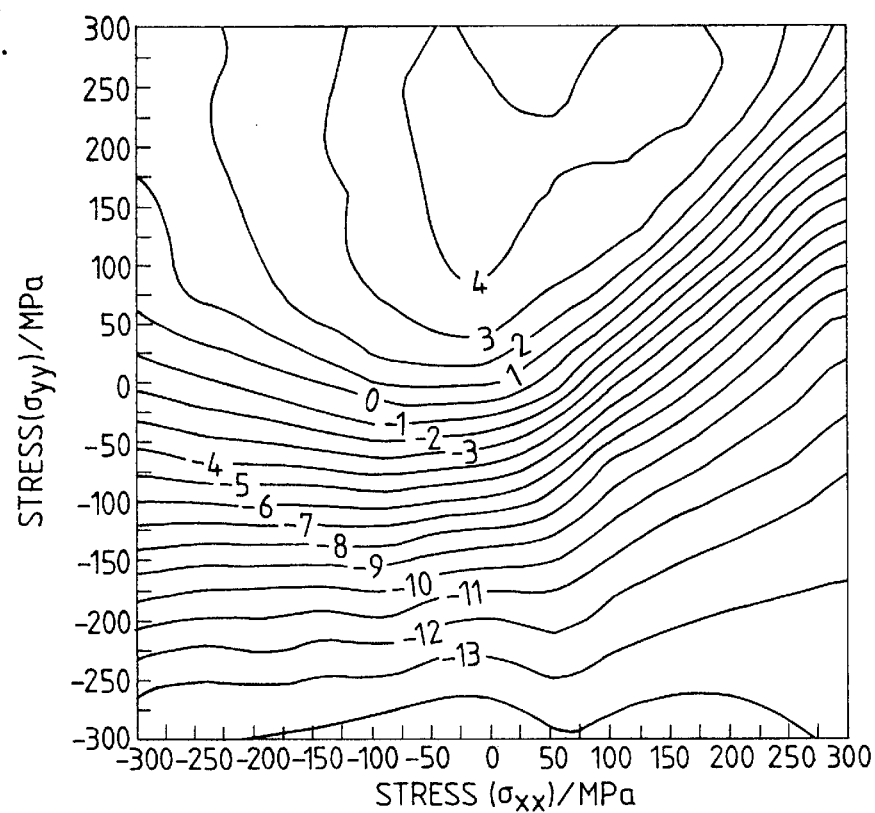
FIG. 5 shows graphically experimental measurements of the variation of the DEP signal with biaxial stresses, with the probe aligned parallel to the other principal stress axis.
Figure 6:
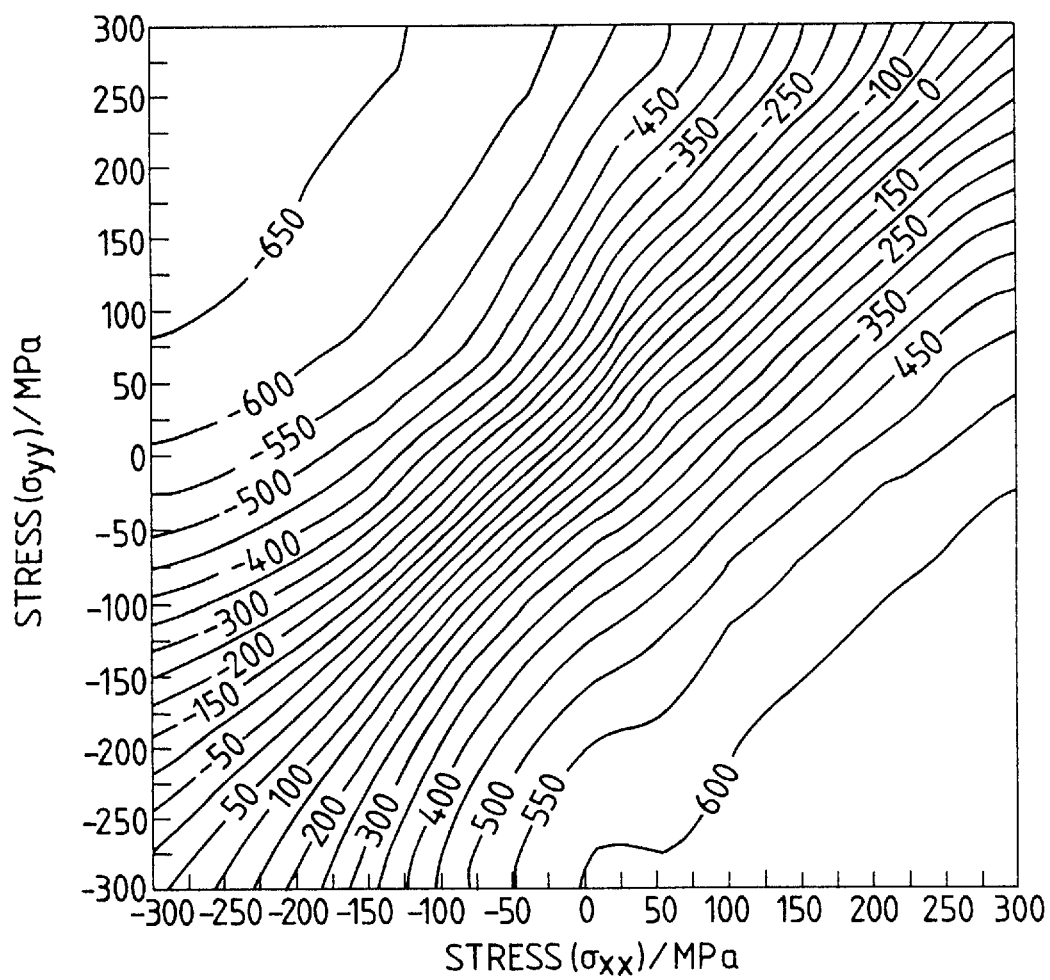
FIG. 6 shows graphically experimental measurements of the variation of the SMA signal with biaxial stresses

Referring now to FIGS. 4 and 5, these indicate by contours the measured values of DEP. FIG. 4 shows the DEP values on the principal stress axis closest to the x-axis of the sample; FIG. 5 shows the DEP values on the principal stress axis closest to the y-axis of the sample. The values were obtained with a steel plate subjected to a wide range of tensile and compressive stresses parallel to the x and y axes of the sample. Referring to FIG. 6, this indicates similarly the measured values of the difference between the maximum and minimum of the quadrature SMA signal during rotation of the probe 12, for the same range of stresses applied to the same steel sample.

Ideally it would be possible to determine the biaxial stresses in the object 16 from measured values of just two of these parameters, by considering where the corresponding contours intersect in the stress plane. However there is in practice some uncertainty in the measured values, and also in the calibration measurements. A more accurate assessment of the biaxial stress in the object 16 can be made as follows. For each position in the stress plane the total number of standard deviations between the measured value of a parameter and the value obtained during calibration is calculated (taking into account the standard errors in both the parameter and in the calibration map). The regions in the stress plane where this quantity is small will be similar to the appropriate contour, but the width of the region is quantified in terms of the number of standard deviations from a perfect fit. This calculation is performed for two, and preferably all three measured parameters (as in FIGS. 4, 5 and 6), and the mean number of standard deviations for all the parameters is calculated for each position in the stress plane. The value of the biaxial stress in the object 16 is then taken to be the centroid of the region in the stress plane for which the mean number of standard deviations is less than, for example, two. An estimate of the uncertainty in this value of biaxial stress is given by the mean number of standard deviations at that position in the stress plane.

It will be appreciated that the apparatus of the invention may differ from that described above. For example the SMA signal might be sensed by a Hall effect sensor, or by a magneto-resistor, rather than a sensor coil. The motor to turn the probe 12 might be beside rather than at the top end of the probe 12. The probe might also incorporate additional sensors, for example a magnetic sensor to sense the magnetic flux density between the poles parallel to the free-space field direction. The head amplifier 25 might be located within the unit 18 instead of being in the probe 12. It will also be appreciated that the frequencies of the alternating drive currents might be different from those described, and that the manner in which the signals are interpreted might differ from that described. Some of these alternatives will now be described in more detail.

It will be appreciated that, with the probe 12, the DEP measurements are obtained by sensing the magnetic flux density in the core 26, which increases as the permeability of the test object 16 increases. Alternatively the DEP measurements might be obtained using an air-cored coil (not shown), between the arms of the U-core 26, whose longitudinal axis is parallel to the free-space field direction. Such a coil detects leakage flux, which will decrease as the permeability of the test object 16 increases. If such a coil is close to the plane of the poles 28 it provides signals which are affected very little by lift-off, but are affected by stress. If such a coil is remote from the poles 28, for example above the support plate 34, it is affected by lift-off to a similar extent to a coil close to the plane of the poles 28, but has almost no sensitivity to stress in the test object 16. Hence an alternative probe utilises two such coils, one close to the plane of the poles 28 and one remote from the poles 28. The signals are subtracted from each other, so that much of the noise is eliminated and little backing-off of the resultant signal is required; to minimize the required backing off the upper coil may have fewer turns than the one close to the plane of the poles. Such a probe may have greater sensitivity to stress and a better signal-to-noise ratio than the probe 12, but is more complex.

In the probe 12, no attempt was made to correct the SMA signals for lift-off. This may be achieved by providing an air-cored reference coil 40 between the arms of the U-core 26 and above the support plate 34, the longitudinal axis of the coil 40 being parallel to the free-space field direction, as described above. By monitoring the signal from this reference coil 40 during SMA measurement, the magnitude of the SMA signals can be simply corrected for lift-off. This requires a calibration of the signal from this coil 40 and the attenuation of the SMA signal with lift-off, and experimental measurements have shown that these are related linearly. For example the reference coil 40 might be 200 turns of copper wire on a rectangular former. The signals from such a reference coil 40 can also be used to normalise the SMA and DEP signals for any variations in gain, magnetic field strength, or frequency.

As described earlier, calibration of the apparatus 10 may be done by making many measurements on a cross-shaped sample of the material of which the object 16 is made when subjected to a wide range of different biaxial stresses. Alternatively the apparatus may be calibrated using a simple bar-shaped sample subjected to four or five different uniaxial stresses, and combining such calibration measurements with a parametric model of the variation of SMA and DEP to biaxial stresses. Hence the stresses within the object 16 can be determined. This method of calibration provides the benefits of requiring a simpler sample of material, requiring far fewer calibration measurements, and with simpler stresses.

Whatever method of calibration is adopted the results will be misleading if the crystal structure of the object 16 has changed, for example with formation of martensite which is both mechanically and magnetically harder than ferrite. The permeability is consequently lower, as are the DEP measurements, so the calculated values of stress would be lower than the true values. The presence of such microstructural changes can be detected by measuring the coercivity of the object 16. This may be done using the drive coil 30 and measuring the signals obtained from the DEP coil.

One procedure is to apply a low frequency (e.g. 0.05 Hz) current to the drive coil 30, of large peak current (e.g. 1.5 A), so the region of the object 16 adjacent to the probe 12 is driven to saturation in alternate directions. The signal emf from the DEP coil has a peak value which occurs every half-cycle, and the value of the drive current at which this occurs (or, more accurately, the mean of the magnitudes of the two values of drive current at which this occurs in a complete cycle) is directly proportional to the coercivity.

We claim:

1. A method for measuring stress in a ferromagnetic material, the method using a probe (12) comprising an electromagnet means defining an electromagnet core (26) and two spaced apart electromagnet poles (28), a first magnetic sensor (32) between the two poles (28) and arranged to sense magnetic flux density perpendicular to the direction of the free space magnetic field between the poles (28), a second magnetic sensor (30) arranged to sense the reluctance of that part of the magnetic circuit between the poles (28) of the electromagnet means, and means (30) to generate an alternating magnetic field in the electromagnet means, the method comprising arranging the probe (12) with the poles (28) adjacent to a location on a surface of a ferromagnetic material (16), generating an alternating magnetic field in the electromagnet means and so also in the ferromagnetic material (16) with a maximum amplitude well below magnetic saturation, turning the probe (12) so the alternating magnetic field in the ferromagnetic material (16) has in succession a plurality of different orientations, detecting the signals from the first sensor (32) with the magnetic field in the plurality of different orientations, determining from the orientations of the magnetic field at which the maxima and minima of the signals from the first sensor (32) occur the directions of the principal stress axes, detecting the signals from the second sensor (30) at least when the magnetic field is aligned with the directions of the principal stress axes, processing the signals from the second magnetic sensor (30) by backing them off with a back-off signal preset such that when the probe is adjacent to a stress-free location the backed-off signal is zero, and then resolving that component of the backed-off signal which, in the impedance plane, is perpendicular to the effect of lift-off from the surface, and using the values of the resolved component with the magnetic field aligned with the directions of the principal stress axes to determine the values of the principal stresses at that location in the material (16).

2. A method as claimed in claim 1 wherein the signals from the first and the second sensors (32, 30) are obtained simultaneously.

3. A method as claimed in claim 1 wherein the signals from the first and the second sensors (32, 30) are obtained successively.

4. A method as claimed in claim 3 wherein the magnetic field is generated at a different frequency when obtaining signals from the first sensor (32) than when obtaining signals from the second sensor (30).

5. A method as claimed in claim 2 wherein the frequency at which the magnetic field is generated is varied to vary the penetration depth of the measurements.

6. A method as claimed in claim 1 wherein the signals from the first sensor (32) are also used in the determination of the values of the principal stresses.

7. A method as claimed in claim 1 wherein the signals from the second sensor (30) are detected at the plurality of different orientations, and the values of the resolved component at all the orientations are used to determine the values of the resolved component with the magnetic field aligned with the directions of the principal stress axes.

8. An apparatus suitable for use in a method for measuring stress in a ferromagnetic material, the apparatus comprising a probe (12) comprising an electromagnet means defining an electromagnet core (26) and two spaced apart electromagnet poles (28), a first magnetic sensor (32) between the poles (28) and arranged to sense magnetic flux density perpendicular to the direction of the free-space magnetic field between the poles (28), a second magnetic sensor (30)

arranged to sense the reluctance of that part of the magnetic circuit between the poles (28) of the electromagnet means, and means (30) to generate an alternating magnetic field in the electromagnet means, and the apparatus also comprising means to provide output signals representing the flux density sensed by the first magnetic sensor (32), and signals representing the reluctance sensed by the second magnetic sensor (30), and means to process the reluctance signals by backing them off with a back-off signal preset such that when the probe is adjacent to a stress-free location the backed-off signal is zero, and then resolving that component of the backed-off signal which, in the impedance plane, is perpendicular to the effect of lift-off from the surface of the material to provide second output signals.

9. An apparatus as claimed in claim 8 also comprising a third magnetic sensor arranged to sense the magnetic flux density parallel to the direction of the free space magnetic field, between the arms but spaced away from the poles (28).

10. An apparatus as claimed in claim 8 also comprising means (14) to rotate the probe to a plurality of different orientations.

* * * * *